(12) United States Patent
Chen et al.

(10) Patent No.: US 6,580,696 B1
(45) Date of Patent: Jun. 17, 2003

(54) MULTI-ADAPTATION FOR A VOICE PACKET BASED

(75) Inventors: Herbert M. K. Chen, Saratoga, CA (US); Fuling Liu, Cupertino, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/406,211

(22) Filed: Sep. 27, 1999

Related U.S. Application Data

(60) Provisional application No. 60/124,708, filed on Mar. 15, 1999.

(51) Int. Cl.[7] ................................................. H04M 9/08
(52) U.S. Cl. ....................................... 370/286; 370/290
(58) Field of Search ................................ 370/286–292; 379/406.06, 406.08

(56) References Cited

U.S. PATENT DOCUMENTS

| | | | | |
|---|---|---|---|---|
| 4,757,527 A | * | 7/1988 | Beniston et al. ............. | 370/290 |
| 4,862,450 A | * | 8/1989 | Guidoux ..................... | 370/289 |
| 4,885,737 A | * | 12/1989 | Guidoux ..................... | 370/291 |
| 5,418,848 A | * | 5/1995 | Armbruster ............ | 379/406.06 |
| 5,555,310 A | * | 9/1996 | Minami et al. ........ | 379/406.06 |
| 5,812,944 A | * | 9/1998 | Matsumoto ............ | 379/406.08 |

* cited by examiner

Primary Examiner—Salvatore Cangialosi
(74) Attorney, Agent, or Firm—Blakely, Sokoloff, Taylor & Zafman LLP

(57) ABSTRACT

The present invention relates to a system and method for canceling echoes from telecommunications networks by providing a multi-adaptation echo canceller. Unlike conventional TDM echo cancellers, the present invention uses at least two echo cancellers arranged in a novel manner to cancel echoes generated by a voice packet associated with an IP network or the like. The present invention further provides a double adaptation echo canceller that transfers coefficients from a first echo canceller to a second echo canceller. The present system compares the single and double adaptation echo error signals and selects the echo canceller with the smaller error signal. This process is continuously repeated so that the system can select the optimal echo canceller for canceling echoes for each voice block/packet. The present invention can be implemented with any number of echo cancellers so long as the each block or packet can be processed within a specified time frame.

24 Claims, 7 Drawing Sheets

MULTI-ADAPTATION FOR A VOICE PACKET BASED

This application claims benefit of provisional application Ser. No. 60/124,708 filed Mar. 15, 1999.

FIELD OF THE INVENTION

The present invention relates to the field of echo cancellers, and more particularly, to a multi-adaptation echo canceller. The present invention is also directed to a novel method and apparatus for canceling echoes associated with voice packet networks.

BACKGROUND OF THE INVENTION

In Time Division Multiplex (TDM) based telephone systems, echoes are generated when a sender's speech is reflected back to the sender from a hybrid interface. FIG. 1 illustrates a conventional hybrid interface 4 between a two wire line that connects a near end subscriber 2 to the hybrid interface 4 and a four wire line (not shown) used for transmission of analog or digital signals within a local exchange. Any speech at point 6 from a far end subscriber that re-emerges at point 8 via the hybrid interface 4 is an echo. Speech at point 8 is transmitted to the far end subscriber and may include speech from the near end subscriber 2 and echoes generated by the hybrid interface 4. Such echoes may be annoying, and under certain conditions can completely disrupt a conversation between the far end subscriber and the near end subscriber. To attenuate such echoes, digital filters are generally used in TDM networks.

Conventional echo cancellation techniques that are currently available are improvements in this field, but they do not eliminate the echoes completely. One conventional method uses a transformer with a number of passive elements. Echoes occur in telecommunication networks due to impedance mismatches at hybrid transformers that couple the two wire line to the four wire line. Ideally, the hybrid transformer transmits the far end subscriber's speech signals at the four wire receive port through to the two wire transmit port without leakage into the four wire transmit port. However, this would require exact knowledge of the impedance seen at the two wire port, which varies widely and can only be estimated. As a result, leakage signals in the form of echoes are transmitted to the far end subscriber.

Another conventional method, an adaptive digital echo canceller, will now be described with reference to FIG. 2. FIG. 2 is a block diagram illustrating an arrangement having a conventional adaptive echo canceller. In general, adaptive digital filters are used to replicate different impulse responses associated with telephones and to compensate for variations in the impulse responses caused by changes in the subscriber loops.

Digital speech signals at point 32 from the far end subscriber are converted to analog signals by a digital to analog converter 22 before the signals reach the hybrid interface 4. Speech signals from the near end subscriber 2 and/or echo signals generated by the hybrid interface 4 are converted to digital signals by an analog to digital converter 24. The digital signals are then transmitted from the A/D converter 24 to a transmission delay 26, which is caused by other transmission devices. The digital speech signals from the near end subscriber 2 and/or the echo signals generated by hybrid interface 4 are then transmitted to a subtractor 30.

Simultaneously, an adaptive filter 28, i.e. Least Means Squares (LMS) digital filter 28, receives the far subscriber speech signals from point 32. Filters using other algorithms such as Recursive Least Squares (RLS) may be substituted for the LMS digital filter. The adaptive filter 28 generates synthetic echo signals based on the real speech signals. The synthetic echo signals are then subtracted from the real echo signals using the subtractor 30, and thus reducing the echo signals transmitted to the far end subscriber. Subtracting the synthetic echo signals from the real echo signals will reduce the amplitude of the echo, and the remaining signal after this subtraction is called the "error signal." The error signal is forwarded to the filter 28 where the coefficients of the filter 28 are adjusted accordingly in an effort to minimize future echoes from being transmitted to the far end subscriber. The magnitude of the echo and the time delay constitute the echo path transfer function.

Adaptive methods such as that described above generally rely on information contained in the speech signals from the far end subscriber. Echo cancellers have been used for TDM networks, which generally uses a sample by sample adaptation. Adaptive filters generally include coefficients that are adjusted based on the LMS or RLS algorithm. The coefficients are updated in a manner opposite to the gradient of the error signal multiplied by a constant number. This constant number is usually referred as an adaptation step size, which effectively controls adaptation speed. However, a large adaptation step size results in stability problems, which sometimes goes into signing or oscillation situations. Such problems get worse when the step size is increased excessively in order to increase adaptation speed.

There are generally two key performance parameters of an echo canceller: ERLE (echo return loss enhancement) and converge time. The ERLE is the degree to which the echo canceller suppresses the echo signal, i.e. the ratio between the echo signal and the error signal measure in dB. The converge time is the time required to reach the ERLE of 26 dB or greater. Currently, the ITU requirement for the converge time is less than 500 ms for a continuous excitation and less than 1 second for speech like bursts.

With the advent of voice packet technology, i.e. Voice over Internet Protocol (VoIP), echo cancellers are becoming increasingly important. This is because the latency and transmission delay of an IP network is much longer than a traditional TDM network. Because the human's perception of an echo signal is proportional to the delay it experiences, controlling its ERLE and converge time performance is highly desirable for a good voice quality.

There are differences in the design of echo cancellers for TDM and IP networks. For example, the echo canceller in the TDM network basically uses a sample by sample process, whereas an echo canceller for an IP network would use a block by block or packet by packet process.

Thus, there is a need for a system and method that can provide echo cancellation by way of a block by block or packet by packet process and can increase converge speed while maintaining robust stability.

SUMMARY OF THE INVENTION

It is an object of the present invention to provide an echo canceller that can provide stability and fast converge time.

It is another object of the present invention to provide an echo canceller that can provide a multi-adaptation, compare, and select process for canceling echoes.

It is yet another object of the present invention to provide an echo canceller having multiple adaptive filters, and thus allowing the system to choose the optimal filter.

It is yet another object of the present invention to provide an echo canceller that can cancel echoes in an IP network.

It is yet another object of the present invention to provide an echo canceller that can cancel echoes using a block by block or packet by packet process.

These and other objects of the present invention are obtained by providing a multi-adaptation echo canceller that transfers coefficients from a first echo canceller to a second echo canceller as the initial coefficients for the second echo canceller. The system compares the single and double adaptation echo error signals and selects the echo canceller with the smaller error signal. This process is repeated so that the system can select the optimal echo canceller for canceling echoes associated with each voice block/packet. The present invention can be implemented with N number of adaptation echo cancellers so long as the each block or packet can be processed within a specified time frame.

BRIEF DESCRIPTION OF THE DRAWINGS

These and other objects and advantages of the present invention will become apparent and more readily appreciated from the following detailed description of the presently preferred exemplary embodiment of the invention taken in conjunction with the accompanying drawings, of which.

DETAILED DESCRIPTION OF THE PREFERRED EMBODIMENTS

The preferred embodiment of the present invention will now be described with reference to FIGS. 3–6. The present invention is directed to a multi-adaptation echo canceller using a block by block or packet by packet process. The present invention is primarily adapted for canceling echoes associated with IP networks. However, one skilled in the art will appreciate that various substitutions and modifications can be made to the examples described herein while remaining within the spirit and scope of the present invention. For example, although a double adaptation echo canceller system and method is presented herein, a derivative architecture using N number of adaptation echo cancellers should be appreciated.

Figure 1:
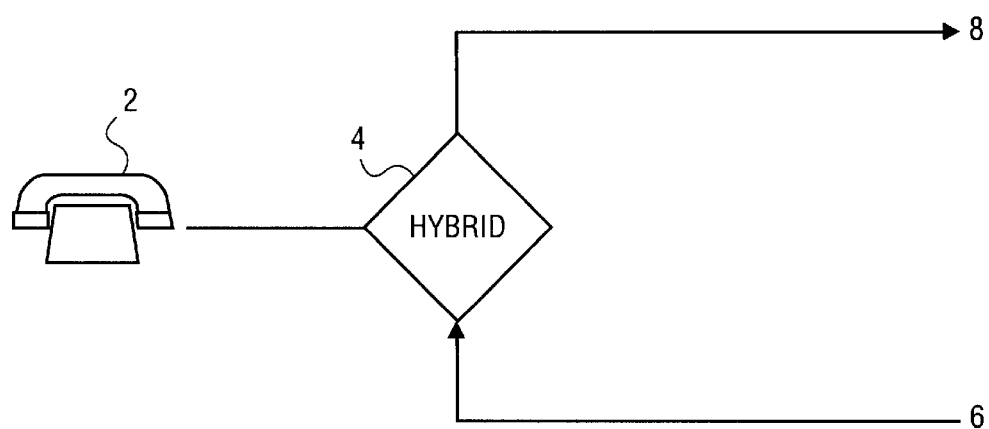
FIG. 1 illustrates a simplified block diagram showing a conventional two to four wire hybrid interface connecting a near end subscriber to a far end subscriber.
Figure 2:
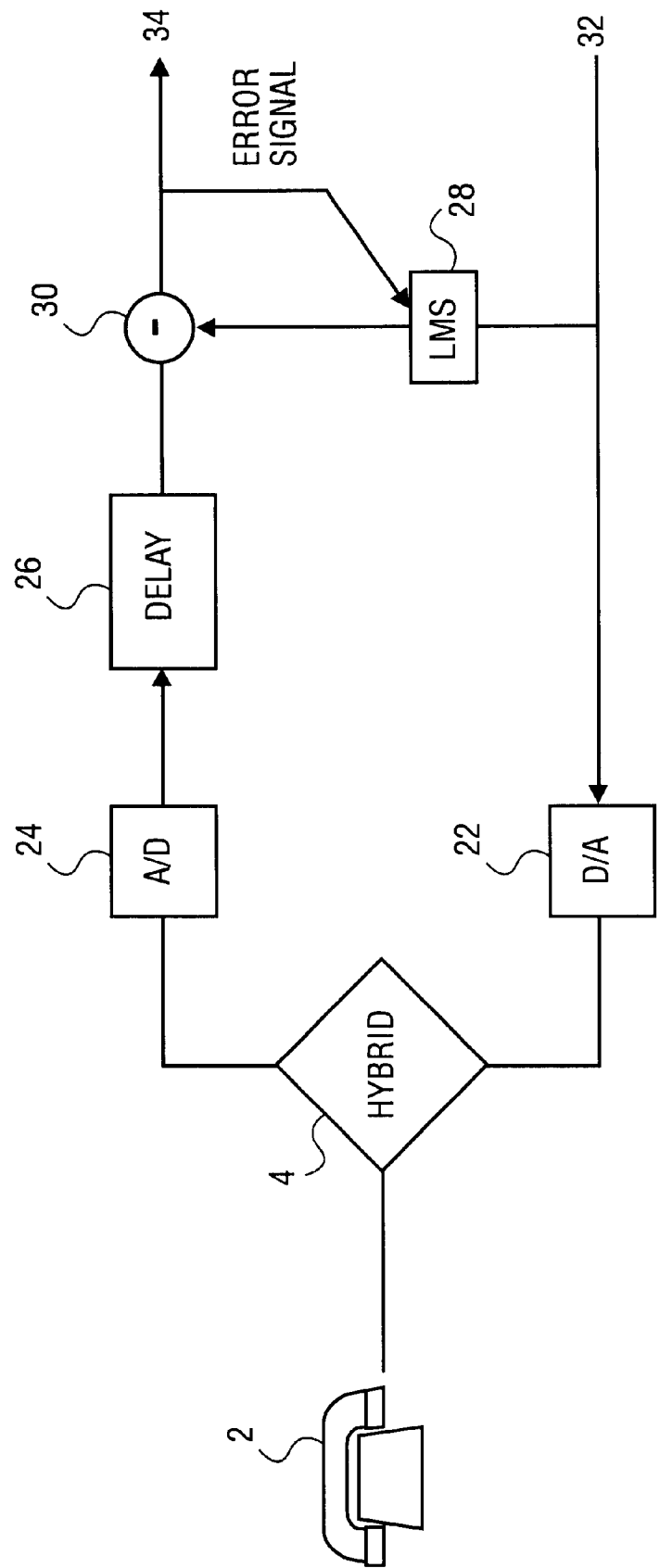
FIG. 2 illustrates a block diagram of an arrangement having a conventional adaptive echo canceller.
Figure 3:
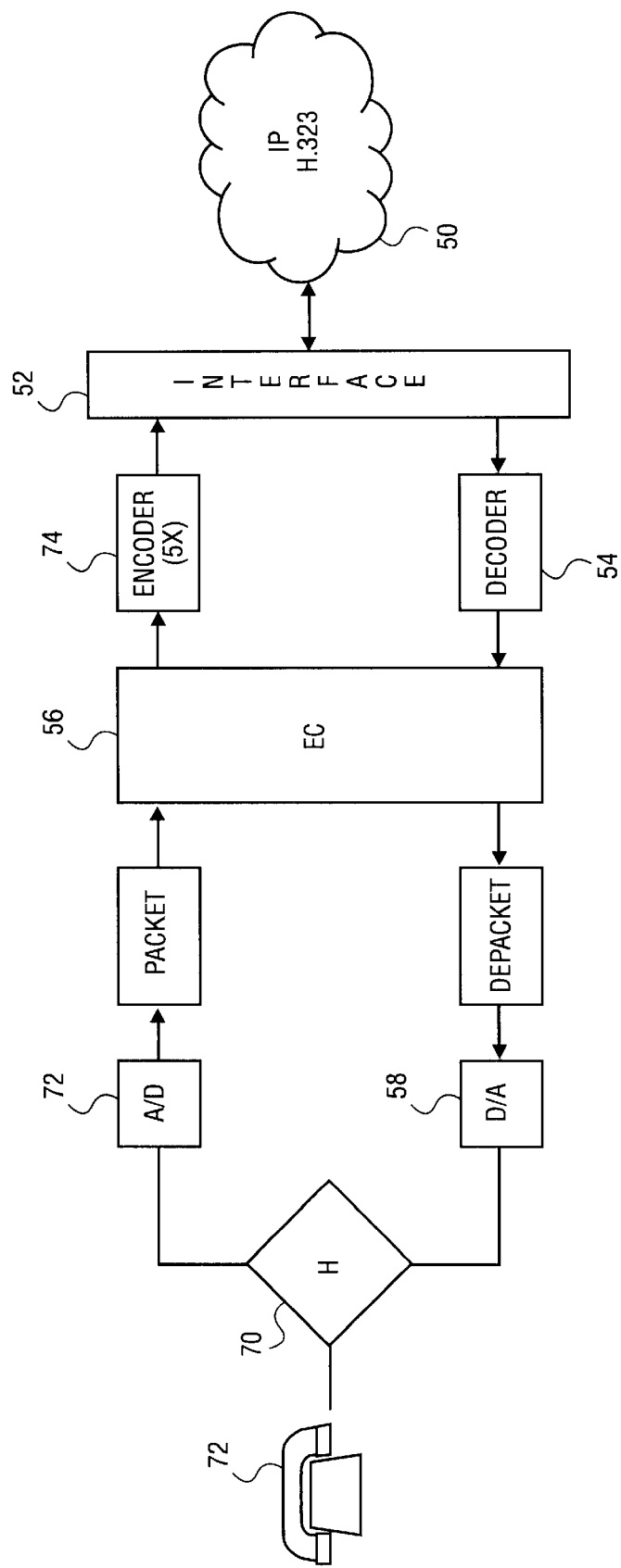
FIG. 3 illustrates an implementation of an echo canceller in accordance with the preferred embodiment of the present invention.

FIG. 3 illustrates an implementation of an echo canceller in accordance with the preferred embodiment of the present invention. The present invention provides echo cancellation for IP networks, H.323 networks, or the like, using a block by block or packet by packet process. As illustrated, IP network 50 communicates with an interface 52 that strips the header information associated with the packets. Next, a conventional decoder 54 such as a PCM decoder is used to decode the stripped packets before transmitting them to the echo canceller (EC) 56 of the present invention. The decoder 54 also is used to convert the compressed signals to linear-coded signals. The EC 56 of the present invention is thus exposed to only digital data and does not communicate directly with the IP network 50.

Simultaneously, the stripped packet data are transmitted to a hybrid 70. First, the packets are de-packeted so as to generate a constant stream of data. Then, the digital signals associated with the packets are converted into analog signals via D/A converter 58. As described earlier, echoes are created when the analog signals reach the hybrid 70. Echo signals and speech signals from a near end subscriber 72 are converted into digital signals via A/D converter 72. These signals are packeted into its respective network required length before they are transmitted to the EC 56. Once the echo signals in each packet are cancelled using the EC 56, each packet is then encoded to a compressed form via an encoder (5X) 74. Each packet is then encapsulated by the interface 52.

Figure 4:
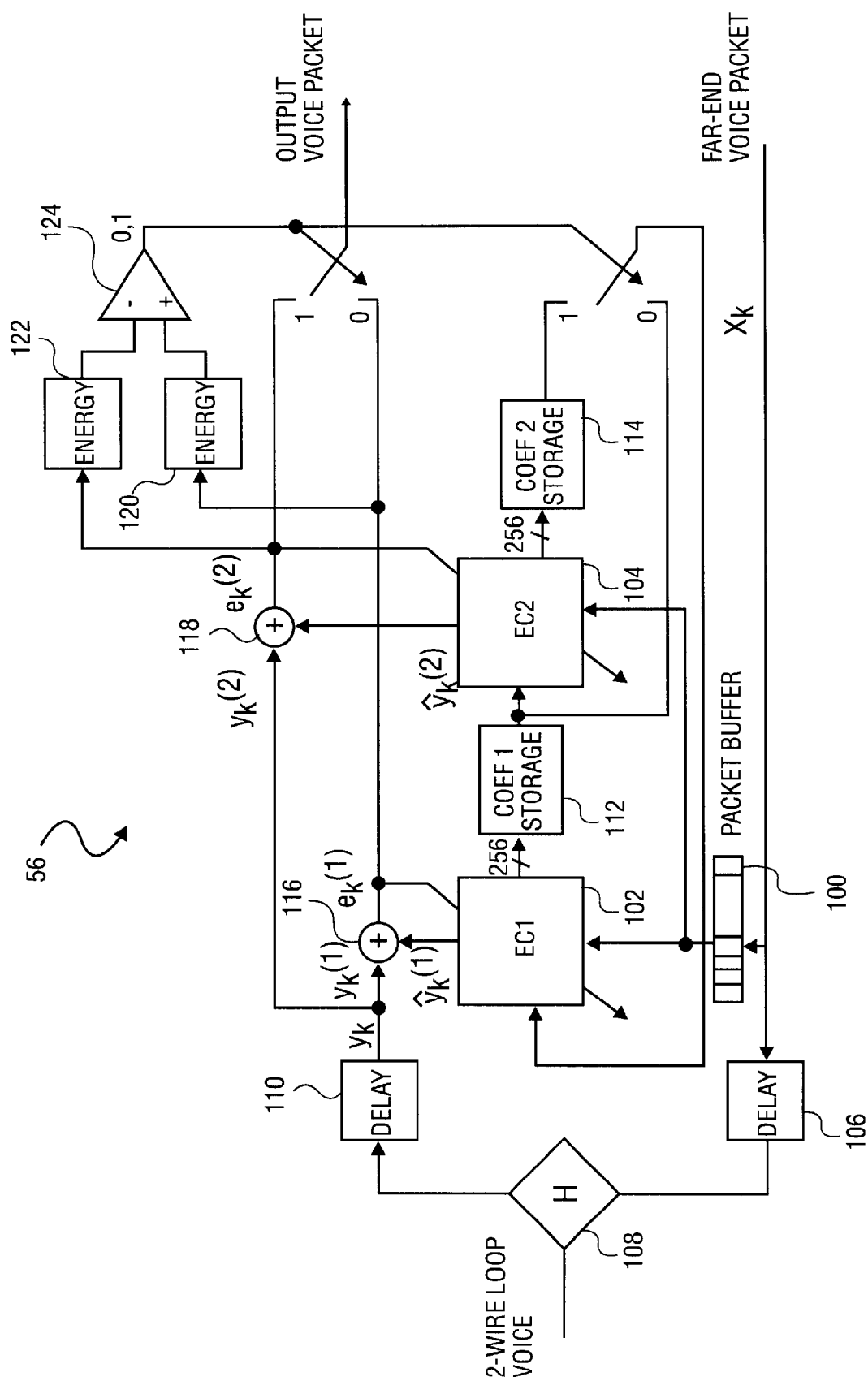
FIG. 4 is a block diagram of an echo canceller in accordance with the preferred embodiment of the present invention.
Figure 5A:
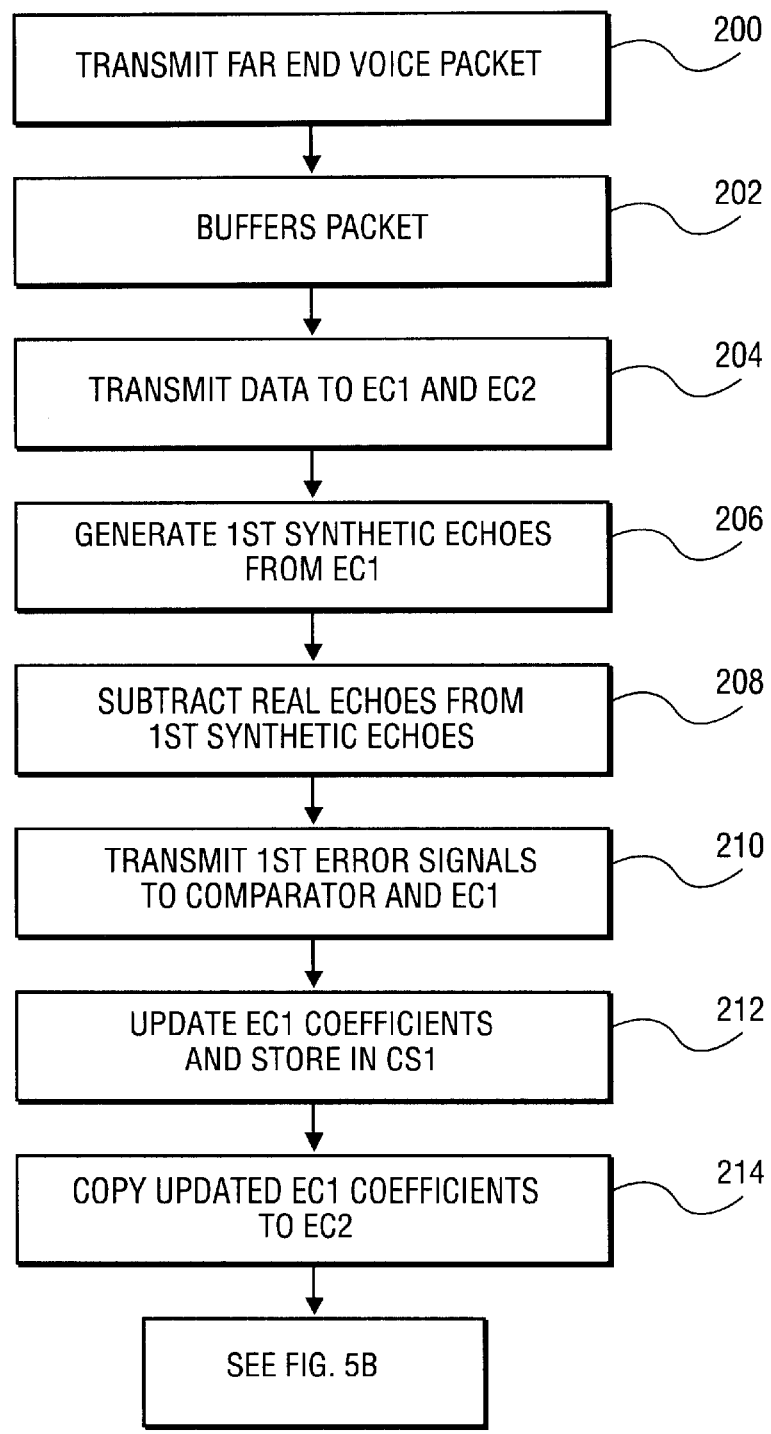
FIGS. 5A and 5B illustrate flowcharts of a method for canceling echoes in accordance with the preferred embodiment of the present invention.
Figure 5B:
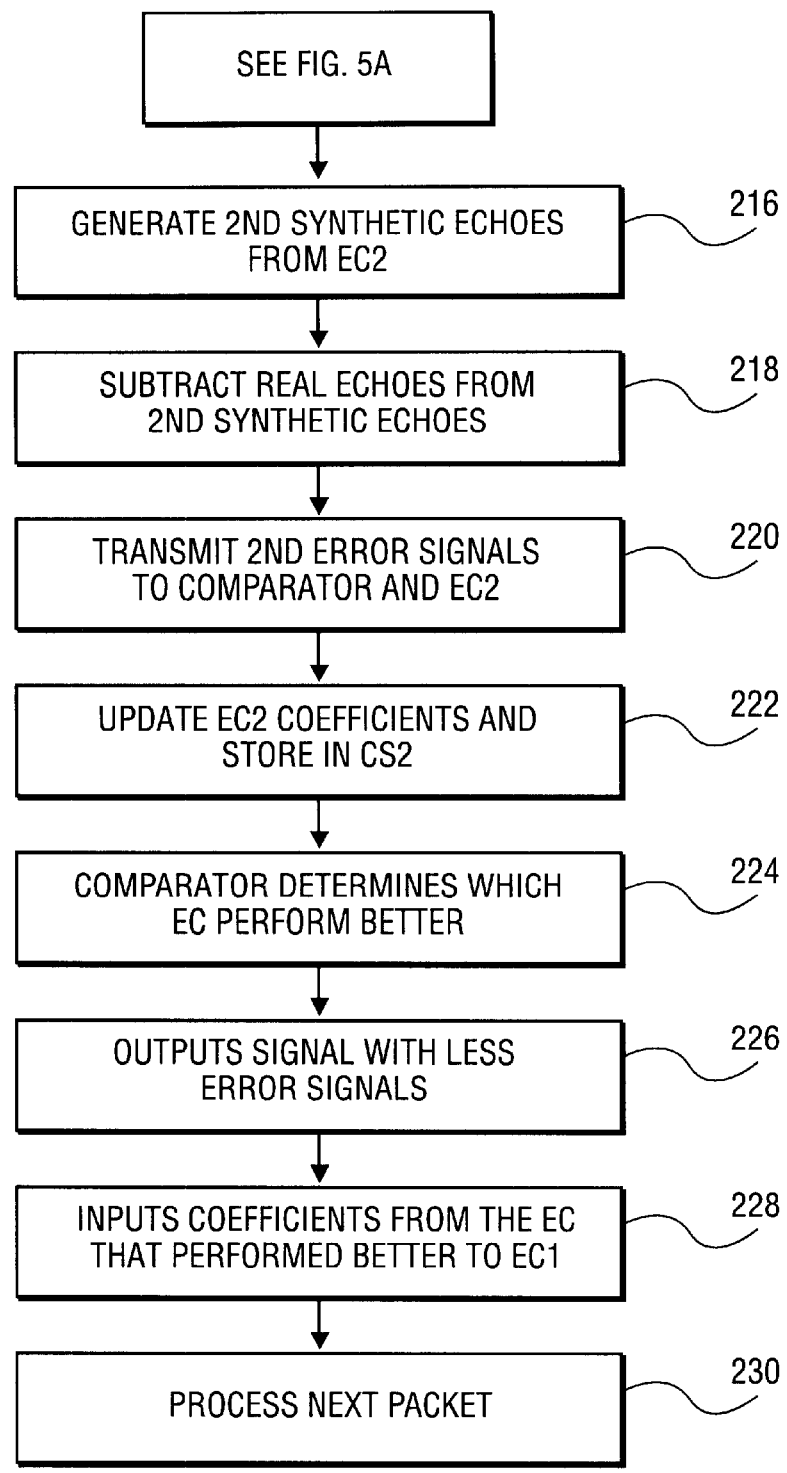

FIG. 4 illustrates a detailed block diagram of the EC 56 in accordance with the preferred embodiment of the present invention. Additionally, FIGS. 5A and 5B illustrate flowcharts of a method for canceling echoes using the EC 56. Reference numbers in FIGS. 4, 5A, and 5B are used in the following discussion to describe the system and method of the present invention.

The EC 56 of the present invention may be implemented with software or hardware, or both. A far end voice packet $X_k$ (where k is the time stamp) originating from a far end subscriber is transmitted to a 2 to 4 wire hybrid interface 108 via a transmission delay 106, which is caused by other transmission devices. Echo signals $Y_k$ are generated from the hybrid interface 108, having an echo amplitude relating to the loop termination. For instance, a short circuit will have no echo back and no loop termination (open circuit), and thus will generate a maximum echo. A loop termination of about 900-ohm will generate an echo somewhere between 0 and maximum echo. Another transmission delay 110 receives the echoes from the hybrid interface 108. In most cases, the round trip delay is between 0 to 32 ms, but sometimes may be longer. In the preferred embodiment of the present invention, the round trip delay of about 32 ms is assumed and considered a part of the echo path function.

Simultaneously, the far end voice packet $X_k$ is transmitted to a packet buffer 100 that preferably has a length of 80 words (1 byte is equivalent to 1 word) in step 200. The packet buffer 100, which preferably fills up with new data every 10 ms, buffers the packet in step 202. The voice signals from the buffered packet are transmitted to a first adaptive filter EC1 102 and a second adaptive filter EC 2 104 in step 204. As described in more detail hereinafter, the voice signals transmitted to EC2 104 will not be processed until the EC1 102 has completed its operation cycle. Thus, a delay mechanism, as known in the art, is used in the EC2 104 to delay the processing of the voice signals.

EC1 102 will first process the voice signals received from the packet buffer 100. In step 206, the voice signals transmitted from the packet buffer 100 are convoluted with the initial 256 coefficients stored in the EC1 102 to generate first synthetic echo signals $\hat{Y}_k^{(1)}$ using the following formula:

$$\hat{Y}_k = \Sigma X_{k-j} \cdot h_j, j=0 \text{ to } 255;$$

where $h_j$ are coefficients of the filter.

The first synthetic echo signals $\hat{Y}_k^{(1)}$ are then subtracted from the real echo signals $\hat{Y}_k^{(1)}$ via a first subtractor 116 to generate the first error signals $e_k^{(1)}$ in step 208. In step 210, the first error signals $e_k^{(1)}$ are low filtered by a first energy detector 120 and then transmitted to a comparator 124. The energy generated from first error signals $e_k^{(1)}$ will be temporarily stored in the energy detector 120. The error signals $e_k^{(1)}$ are also fed back to the EC1 102.

After receiving the first error signals $e_k^{(1)}$, the 256 coefficients in the EC1 102 are updated according to the following LMS algorithm in step 212:

$$h_{k+1j}=h_{kj}+\Delta \cdot x_{k-j} \cdot e_k;$$

where k is the time, j=0 to 255, and $\Delta$ is the step size. Thereafter, the updated 256 coefficients are transmitted to and temporarily stored in a first coefficient storage 112. These updated 256 coefficients stored in the first coefficient storage 112 will then be copied into the EC2 104 in step 214 and be used as the initial coefficients of the EC2 104.

Once the operation cycle of the EC1 102 is complete, the second adaptive filter EC2 104 begins processing the buffered voice signals. The EC2 104 will receive the identical voice signals as those received by EC1 102 from the packet buffer 100.

The voice signals transmitted from the packet buffer 100 are again convoluted with the coefficients stored in the EC2 104 to generate second synthetic echo signals $\hat{Y}_k^{(2)}$ using the following the in step 216:

$$\hat{Y}_k = \Sigma X_{k-j} \cdot h_j, j=0 \text{ to } 255;$$

where $h_j$ are coefficients of the filter. In step 218, the second synthetic echo signals $\hat{Y}_k^{(2)}$ are again subtracted from the real echo signals $Y_k^{(2)}$ by a second subtractor 118 to generate the second error signals $e_k^{(2)}$. In all cases, real echo signals $Y_{k=Yk}^{(1)}=Y_k^{(2)}$. The second error signals $e_k^{(2)}$ are low filtered by a second energy detector 122 and transmitted to the comparator 124 in step 220. The error signals $e_k^{(2)}$ are also fed back to EC2 104 in step 220. After receiving the second error signals $e_k^{(2)}$, the 256 coefficients in EC2 104 are updated according to the following same LMS algorithm in step 222:

$$h_{k+1j}=h_{kj}+\Delta \cdot x_{k-j} \cdot e_k;$$

where k is the time, j=0 to 255, and $\Delta$ is the step size. The updated 256 coefficients from the EC2 104 are then transmitted to a second coefficient storage 114 in step 222.

The comparator 124 in step 224 will compare the energies from first and second error signals $e_k^{(1)}$ and $e_k^{(2)}$. Preferably, the comparator 124 will use a 10 ms short term averaging method. By comparing the two error signals, the comparator 124 can determine which adaptive filter, EC1 102 or EC2 104, has yielded smaller error signals (energy), and preferably assign an output '1' to signify that the error signals $e_k^{(1)}$ are greater than error signal $e_k^{(2)}$. Thus, the comparator 124 can determine which adaptive filters, EC1 102 or EC2 104, performed better and select the voice packet corresponding to the smaller error signals as its output in step 226. The comparator 124 can additionally select the 256 coefficients from either the first coefficient storage 112 or the second coefficient storage 114 that corresponds to the adaptive filter that performed better and transmit the selected coefficients into the EC1 102 for processing the next packet in step 228.

Preferably, the above-described steps 200 through 228 of FIGS. 5A and 5B are repeated every 10 ms for each block or packet. For every 10 ms, there will be 80 words transmitted to the EC1 102 and EC2 104.

At the converge point, the coefficient adaptation will be very small and remains that way until the echo path changes. As can be appreciated, the advantage of the present invention is not increasing the step size as a way to speed up the converge time. A double adaptation echo canceller compares the performance of the two adaptive filters and selects the one with better performance. Through this process, a robust stability and fast converge time can be achieved.

Further, both adaptive filters EC1 102 and EC2 104 in the above example are preferably LMS based adaptive digital filters, but other filters using different algorithms such as RLS may be used in accordance with the present invention.

Figure 6:
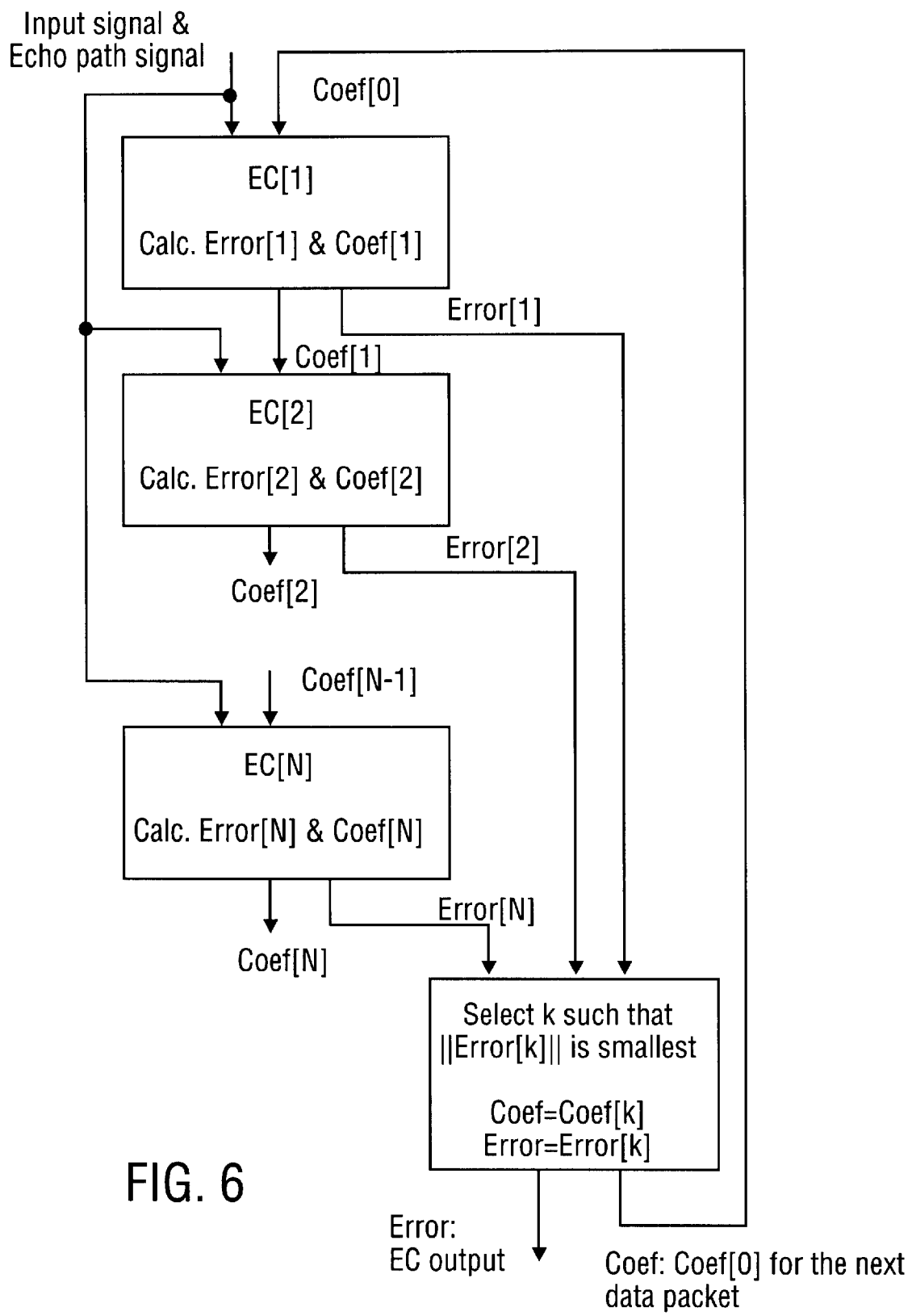
FIG. 6 illustrates an implementation of an echo canceller in accordance with another preferred embodiment of the present invention.

As stated earlier herein, although a double adaptation system and method has been described in detail, one skilled in the art can appreciated that more than two adaptation filters, echo cancellers, can be implemented in accordance with the present invention. For example, once the operation cycle of the EC2 104 is complete, a third echo canceller can begin processing the buffered voice signals. The third echo canceller would receive the buffered voice signals from the packet buffer 100 and generate third synthetic echo signals based on the updated coefficients that are stored in the second coefficient storage 114. The real echo signals would be subtracted from the third synthetic echo signals, thereby generating third error signals. The coefficients of the third echo canceller would be updated based on the third error signals and stored in a third coefficient storage. A comparator compares the first, second, and third error signals and determines which echo canceller performed the best. After the comparator determines which echo canceller performed the best, the output signals are selected and the updated coefficients from the optimal echo canceller are inputted into the first echo canceller for processing the next packet. As can be appreciated, this process can be implemented with N number of echo cancellers. Such implementation with N number of echo cancellers is illustrated in FIG. 6.

Although various preferred embodiments of the present invention have been disclosed for illustrative purposes, those skilled in the art will appreciate that various modifications, additions and/or substitutions are possible without departing from the scope and spirit of the present invention as disclosed in the claims.

I claim:

1. A method for canceling a real echo associated with a voice packet, the method comprising the steps of:
   (a) providing the voice packet to a first echo canceller and a second echo canceller;
   (b) generating a first synthetic echo and a second synthetic echo;
   (c) subtracting the first synthetic echo from the real echo to generate a first error signal, and subtracting the second synthetic echo from the real echo to generate a second error signal; and
   (d) determining whether the first echo canceller performed better than the second echo canceller based on the first error signal and the second error signal.

2. A method according to claim 1 further comprising the step of buffering the voice packet before performing step (a).

3. A method according to claim 2, wherein the buffering step is performed every 10 ms.

4. A method according to claim 1, wherein step (b) is performed by a first echo canceller and a second echo canceller, respectively.

5. A method according to claim 1, wherein the first synthetic echo is generated before the second synthetic echo.

6. A method according to claim 1, wherein the first synthetic echo is generated with the first set of coefficients from a first echo canceller.

7. A method according to claim 6 further comprising the steps of:
   updating the first set of coefficients stored in the first echo canceller based on the first error signal;

storing the updated first set of coefficients in a first coefficient storage; and copying the updated first set of coefficients into a second echo canceller.

8. A method according to claim 7 further comprising the steps of:

updating the updated first set of coefficients stored in the second echo canceller based on the second error signal; and storing the twice updated coefficients in a second coefficient storage.

9. A method according to claim 1, wherein step (d) further comprises the step of transmitting the first error signal and second error signal to a comparator.

10. A method according to claim 9, wherein the comparator determines whether the first echo canceller performed better than the second echo canceller.

11. A method for canceling a real echo associated with a voice packet, the method comprising the steps of:

(a) providing the voice packet to N echo cancellers;

(b) generating N synthetic echoes;

(c) subtracting each of the N synthetic echoes from the real echo to generate N error signals; and (d) determining which of the N echo cancellers performed the best based on the N error signals.

12. A method according to claim 11, wherein N comprises 2.

13. A method according to claim 11, wherein N comprises 3.

14. A method according to claim 11, wherein N comprises 4.

15. A system for canceling an echo, comprising:

a first echo canceller and a second echo canceller adapted to generate a first synthetic echo signal and a second synthetic echo signal, respectively, based on a voice packet data;

a first subtractor adapted to subtract the first synthetic echo signal from a real echo signal to generate a first error signal;

a second subtractor adapted to subtract the second synthetic echo signal from the real echo signal to generate a second error signal; and a comparator adapted to compare the first error signal with the second error signal for determining whether the first echo canceller performed better than the second echo canceller.

16. A system according to claim 15, wherein the voice packet data is received by the first echo canceller and the second echo canceller from an IP network.

17. A system according to claim 15 further comprising a packet buffer adapted to buffer the voice packet data before the first echo canceller and the second echo canceller receive the voice packet data.

18. A system according to claim 17, wherein the packet buffer receives new voice packet data every, 10 ms.

19. A system according to claim 15, wherein the first echo canceller and the second echo canceller each includes an LMS adaptive digital filter.

20. A system according to claim 15, wherein the first echo canceller and the second echo canceller each includes an RLS adaptive digital filter.

21. A system for canceling an echo, comprising:

N echo cancellers adapted to generate N synthetic echo signals based on a voice packet data;

N subtractors adapted to generate N error signals, wherein each subtractor is adapted to subtract one of N synthetic echo signals from a real echo signal; and a comparator adapted to compare the N error signals for determining which one of the N echo cancellers performed the best.

22. A system according to claim 21, wherein N comprises 2.

23. A system according to claim 21, wherein N comprises 3.

24. A system according to claim 21, wherein N comprises 4.

* * * * *